(12) United States Patent
Cansever

(10) Patent No.: US 10,439,975 B2
(45) Date of Patent: Oct. 8, 2019

(54) PRIORITY ASSIGNMENT BASED ON SIMILARITY

(71) Applicant: The Government of the United States, as represented by the Secretary of the Army, Washington, DC (US)

(72) Inventor: Derya Cansever, Havre de Grace, MD (US)

(73) Assignee: The Government of the United States, as represented by the Secretary of the Army, Washington, DC (US)

(*) Notice: Subject to any disclaimer, the term of this patent is extended or adjusted under 35 U.S.C. 154(b) by 168 days.

(21) Appl. No.: 15/730,790

(22) Filed: Oct. 12, 2017

(65) Prior Publication Data

US 2018/0069822 A1    Mar. 8, 2018

Related U.S. Application Data

(62) Division of application No. 14/079,721, filed on Nov. 14, 2013, now Pat. No. 9,794,210.

(51) Int. Cl.
*G06F 15/16* (2006.01)
*H04L 12/58* (2006.01)
*H04L 12/24* (2006.01)

(52) U.S. Cl.
CPC ............ *H04L 51/26* (2013.01); *H04L 41/026* (2013.01); *H04L 51/14* (2013.01); *H04L 51/16* (2013.01)

(58) Field of Classification Search
CPC ......... H04L 51/26; H04L 51/14; H04L 51/16; H04L 41/026

USPC ................................................. 709/207, 223
See application file for complete search history.

(56) References Cited

U.S. PATENT DOCUMENTS

| 6,212,361 | B1 | 4/2001 | Lui |
| 7,948,878 | B2 | 5/2011 | Briscoe et al. |
| 8,019,051 | B1* | 9/2011 | Childs .............. H04M 1/7255 379/67.1 |

(Continued)

OTHER PUBLICATIONS

Ciftcioglu, et al., Operational Information Content Sum Capacity: Formulation and Examples, 14th International Conference on Information Fusion, Chicago, Illinois, USA, Jul. 5-8, 2011.

(Continued)

*Primary Examiner* — Philip B Tran
(74) *Attorney, Agent, or Firm* — Ronald Krosky; Azza Jayaprakash

(57) ABSTRACT

Priority assignment embodiments are discussed. In one embodiment, a system comprises a comparison component configured to make a first comparison of a first message of a message set against a mission with regard to a similarity of the first message to the mission to produce a first message similarity result and make a second comparison of a second message of the message set against the mission with regard to a similarity of the second message to the mission to produce a second message similarity result. The system also comprises a priority component configured to assign a transfer priority order among the first message and the second message through use of the first message similarity result and the second message similarity result, where the transfer priority order is based, at least in part, on the more similar a message is to the mission the higher priority given to the message.

20 Claims, 13 Drawing Sheets

(56) References Cited

U.S. PATENT DOCUMENTS

| | | | |
|---|---|---|---|
| 8,375,097 B2 | 2/2013 | Lawler et al. | |
| 8,447,015 B2 | 5/2013 | Runge et al. | |
| 9,262,531 B2 | 2/2016 | Ferren et al. | |
| 2003/0014490 A1 | 1/2003 | Bates et al. | |
| 2003/0229574 A1* | 12/2003 | Friedman | G06Q 40/04 705/37 |
| 2004/0006601 A1 | 1/2004 | Bernstein et al. | |
| 2006/0010217 A1 | 1/2006 | Sood | |
| 2006/0161679 A1 | 7/2006 | Ludvig et al. | |
| 2006/0235933 A1* | 10/2006 | Baluja | G06Q 10/107 709/207 |
| 2006/0277098 A1* | 12/2006 | Chung | G06Q 30/02 705/14.22 |
| 2007/0162339 A1 | 7/2007 | Arning et al. | |
| 2007/0206620 A1 | 9/2007 | Cortes et al. | |
| 2009/0034693 A1* | 2/2009 | Anderson | G06F 17/279 379/88.01 |
| 2009/0150507 A1* | 6/2009 | Davis | H04L 51/14 709/207 |
| 2010/0274889 A1* | 10/2010 | Carter | H04L 29/0809 709/224 |
| 2011/0080897 A1 | 4/2011 | Hernandez et al. | |
| 2013/0034078 A1 | 2/2013 | Stanwood et al. | |
| 2013/0173333 A1* | 7/2013 | Zhang | G06Q 30/02 705/7.29 |
| 2013/0262476 A1 | 10/2013 | Barak et al. | |

OTHER PUBLICATIONS

Bar-Noy, et al., Quality-of-Information Aware Networking for Tactical Military Networks, IEEE International Workshop on Information Quality and Quality of Service for Pervasive Computing (IQ2S)—held with IEEE Percom 2011.

* cited by examiner

US 10,439,975 B2

PRIORITY ASSIGNMENT BASED ON SIMILARITY

CROSS-REFERENCE

This application is a divisional application of, and claims priority to, U.S. application Ser. No. 14/079,721 filed on Nov. 14, 2013. U.S. application Ser. No. 14/079,721 is hereby incorporated by reference.

GOVERNMENT INTEREST

The innovation described herein may be manufactured, used, imported, sold, and licensed by or for the Government of the United States of America without the payment of any royalty thereon or therefore.

BACKGROUND

In a communication network, different messages can be transmitted from a source to a destination. If more messages are to be transmitted then the communication network can handle at one time, some messages are sent while others are delayed in being sent. A situation could arise where a message with information that is of relatively little value is transmitted before a message with highly valuable information is delayed. Thus, highly valuable information may not be received in a timely manner.

SUMMARY

In one embodiment, a system comprises a comparison component and a priority component. The comparison component can be configured to make a first comparison of a first message of a message set against a mission with regard to a similarity of the first message to the mission to produce a first message similarity result and make a second comparison of a second message of the message set against the mission with regard to a similarity of the second message to the mission to produce a second message similarity result. The priority component can be configured to assign a transfer priority order among the first message and the second message through use of the first message similarity result and the second message similarity result, where the transfer priority order is based, at least in part, on the more similar a message is to the mission the higher priority given to the message and where the comparison component, the priority component, or a combination thereof is implemented, at least in part, by way of non-software.

In one embodiment, a system comprises a processor and a non-transitory computer-readable storage medium communicatively coupled to the processor that stores a command set executable by the processor to facilitate operation of components. These components can comprise a rank component that ranks individual data communications of a data communication set based, at least in part, on an Information Value of the individual data communications, where the Information Value for a particular individual data communication is a relationship of a content of the particular individual data communication to significant unknown data to a destination. These component cans also comprise a transmission component that causes ordered transmission of the individual data communications to the destination based, at least in part, on their rank.

A non-transitory computer-readable medium that stores processor-executable instructions that when executed by a processor cause the processor to perform a method. The method can comprise identifying an objective of an entity of interest and identifying a message set designated for communication along a communication path, where the communication path is not capable of being used for communication of the message set within a time frame. In addition, the method can comprise evaluating the objective to produce an objective evaluation result and evaluating individual messages of the message set to produce individual message results that are suitable for comparison with the objective evaluation result. Further, the method can comprise comparing individual message results with the objective evaluation result to produce individual comparison results for individual messages of the message set that designate a similarity quantity of an individual message with the objective and ranking the plurality of messages according to their individual comparison result in order of their similarity quantity with more similarity equating to higher ranking. The method can also comprise assigning individual messages of the plurality of messages into one of a plurality of priority groups, where individual priority groups of the plurality of priority groups are ordered from first for communication to last for communication as well as causing the individual messages to be sent to the entity of interest in accordance with the order of their priority group.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1A:
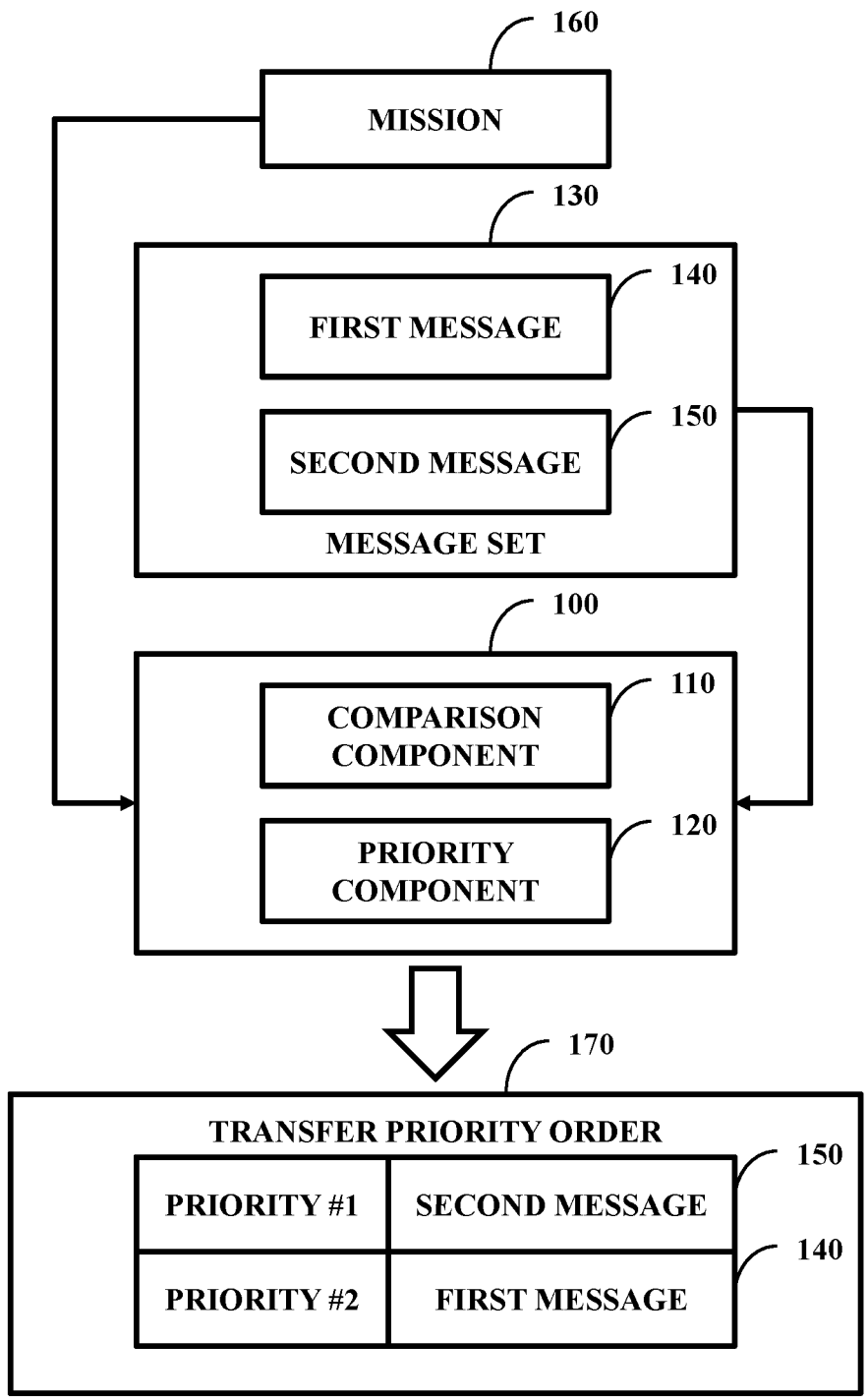
FIGS. 1A and 1B illustrate one embodiment of a system comprising a comparison component and a priority component.

In a communication network, a plurality of different messages can be designated for communication between a source and a destination. This plurality of messages may be more than the communication network can process at one time. Therefore, the communication network can prioritize the messages. In one example, the communication network can be employed to facilitate completion of a mission. In order to complete this mission, it may be beneficial for a source to receive certain information. The messages can be evaluated to determine their content and to determine if this content communicates the certain information. The more likely the message is to communicate this certain information, then the higher priority the message can be given and in turn the sooner the message can be sent to the destination.

In one embodiment, mutual information between individual messages and the mission (e.g., uncertainty associated with the mission) can be identified. The more mutual information that exists, then the more similar the individual message can be considered to the mission. A message with more mutual information can be given a higher priority than a message with less mutual information and thus be sent out first and/or employ better network capabilities, such as shorter or more reliable routes.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 1B:
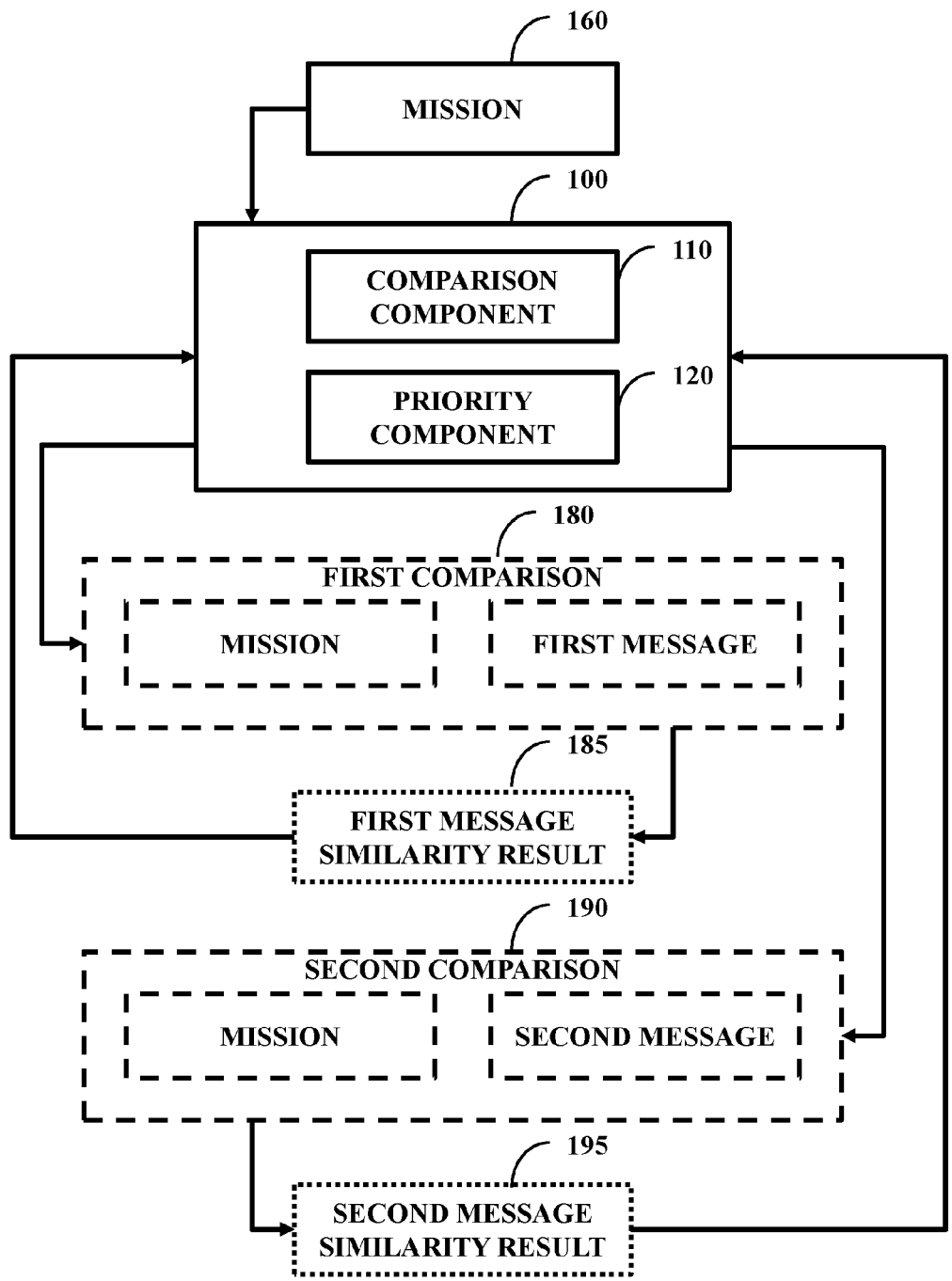

FIGS. 1A and 1B illustrate one embodiment of a system 100 comprising a comparison component 110 and a priority component 120. The system 100 can be in communication with a message set 130 that comprises a first message 140 and a second message 150 along with a mission 160. While the message set 130 is illustrated as having two messages, it is to be appreciated that the message set 130 can have more or less messages (e.g., three messages, one message, a single message that can be broken down into smaller messages, etc.). The message set 130 can simply be an identified or messages for sending through a network (e.g., messages sent from a common designation, messages designated for a specific source, messages that do not share a source or destination, etc.) Furthermore, the system 100 can cause an output and use of a transfer priority order 170 for one or more messages of the message set 130.

The comparison component 110 can be configured to make a first comparison 180 of the first message 140 of the message set 130 against the mission 160 with regard to a similarity of the first message 140 to the mission 160 to produce a first message similarity result 185 (e.g., first value of information). In one embodiment, this can comprise being configured to compute of a first value of information based, at least in part, on mutual information between the first message 140 and uncertainty associated with the mission 160 (e.g., entropy of the mission 160 minus conditional entropy of the mission 160 given the first message 140). The comparison component 110 can also be configured to make a second comparison 190 of the second message 150 of the message set 130 against the mission 160 with regard to a similarity of the second message 150 to the mission 160 to produce a second message similarity result 195 (e.g., second value of information). In one embodiment, this can comprise being configured to compute the second value of information based, at least in part, on mutual information between the second message 150 and uncertainty associated with the mission 160 (e.g., entropy of the mission 160 minus conditional entropy of the mission 160 given the second message 150). The priority component 120 can be configured to assign the transfer priority order 170 among the first message 140 and the second message 150 through use of the first message similarity result 185 and the second message similarity result 185. The transfer priority order 170 can be based, at least in part, on the more similar a message is to the mission 160 the higher priority given to the message.

In one example, the mission 160 can be elimination of an enemy tank whose specific location is unknown. Information of various types and from various sources can be gathered, such as weather reports, first-hand accounts, photographs, etc. This information can be designated to be sent to a source in order to help the source determine the specific location of the tank. For example the first message 140 can be a weather report that no precipitation has occurred in an area over a set period of time while the second message 150 can be a photograph that shows grass matted down in a pattern similar to grass subjected to the weight of a tank. With this, the second message 150 is more similar to the first message 140 since the second message includes more useful information to the mission. The second message 150 may be considered more useful to the mission 160 since it provides more information on tank location thank the first message 140. Thus, the second message 150 can be given a higher priority than the first message in the transfer priority order 170. While this is a military example, it is to be appreciated that aspects disclosed herein can be used in other areas, such as telecommunications, computer networking, social media, etc.

In one embodiment, the first message similarity result 185 and the second message similarity result 195 correlate to providing an amount of assistance in decoding an actual realized value of a random variable for the mission 160. The more similar a message is (e.g., the first message 140 is) then the more the message provides the amount of assistance. Thus, the more assistance a message provides and in turn the more assistance a message provides, the more similar the message and thus the higher the priority of the message.

In one example, a cable television communication environment can experience an error and the mission 160 can be to find, diagnose, and correct the error. The first message 140 can be that a first neighborhood is not stopped receiving cable at a certain time while the second message 150 can be that the second neighborhood has not experienced an interruption in cable service. Random variables can be the cause of error and the mission 160 can request to know where the problem occurred, what occurred, and what services are interrupted. While both the first message 140 and the second message 150 provide information, the assistance of the first message 140 can be more since a time of error is provided and more may be understood from a message describing the error than information that can be used in eliminating a source of the error. Therefore, the first message 140 can be considered to provide more actual realized value than the second message 150.

In one embodiment, a priority component 120 can be configured to assign the transfer priority order 170 among the first message 140 and the second message 150 absent consideration of provenance, accuracy, precision, reliability, credibility, corroboration, timeliness, or a combination thereof for the first message 140 and the second message 150. In one example, the mission 160 can be that soda machines of a soda company are properly filled. The first message 140 can be a first short text message (e.g., a tweet) from a office building worker that states a soda machine in the worker's building is very low on cherry soda and diet soda while the second message 150 can be a diagnostic message from a soda company machine filler that the same soda machine has 3 cheery sodas remaining, but is silent on the status of diet sodas. The system 100 can determine that two low information types (low cheery and low diet) are more similar to critical information than one information type (3 cherry sodas remaining) and therefore the first message 140 has higher priority than the second message 150. That can occur despite the fact that more precision is provided in the second message (a number as opposed to the designator 'low') and that the second message may be from a more reliable and/or more formal source (text message of office worker as opposed to a diagnostic message from a company employee).

Figure 2:
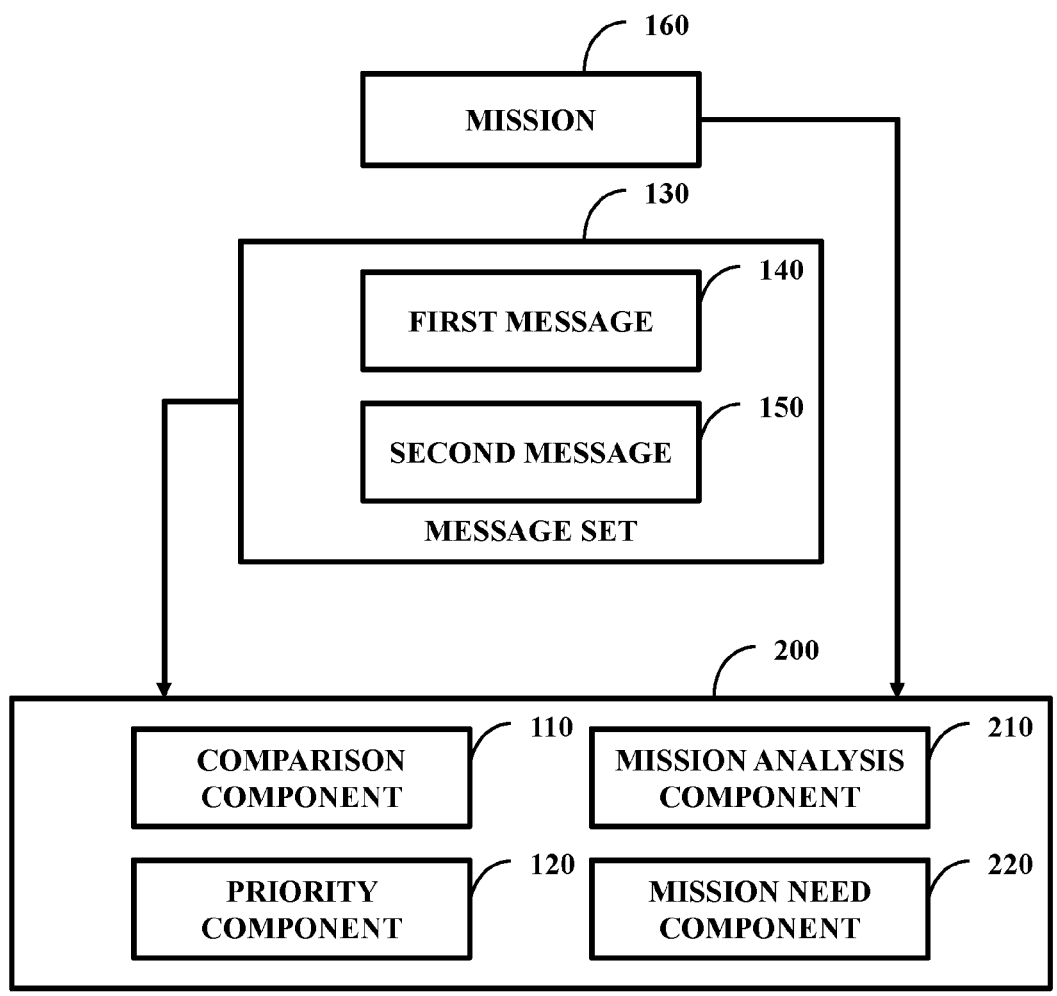
FIG. 2 illustrates one embodiment of a system comprising the comparison component, the priority component, a mission analysis component, and a mission need component.

FIG. 2 illustrates one embodiment of a system 200 comprising the comparison component 110, the priority component 120, a mission analysis component 210, and a mission need component 220. The mission analysis component 210 can be configured to analyze the mission 160 to produce a mission analysis result. The mission need component 220 can be configured to identify a mission need of the mission 160, such as an information need, through use of at least the mission analysis result. In one embodiment, the similarity of the first message 140 of the mission set 130 to the mission 160 can be how much the first message 140 meets the information need of the mission 160. Likewise, the similarity of the second message 150 of the mission set 130 to the mission can be how much the second message meets the information need of the mission 160.

In one example, the system 200 could be independent, separate, and distinct of a system that attempts to fulfill the mission 160. For example, the system 200 can reside on a diagnostic tool that plugs into hardware of the system that attempts to fulfill the mission 160. Analysis of the mission 160 can include evaluation of the mission, accessing a communication that indicates the mission need, etc. Identification of the mission need can include determining how to optimize operation of the system that attempts to fulfill the mission 160, using at least one artificial intelligence technique to identify missing information, reading the communication that indicates the mission need, etc. With the need identified, the comparison component 110 and the priority component 120 can operate in view of the identified need.

Figure 3:
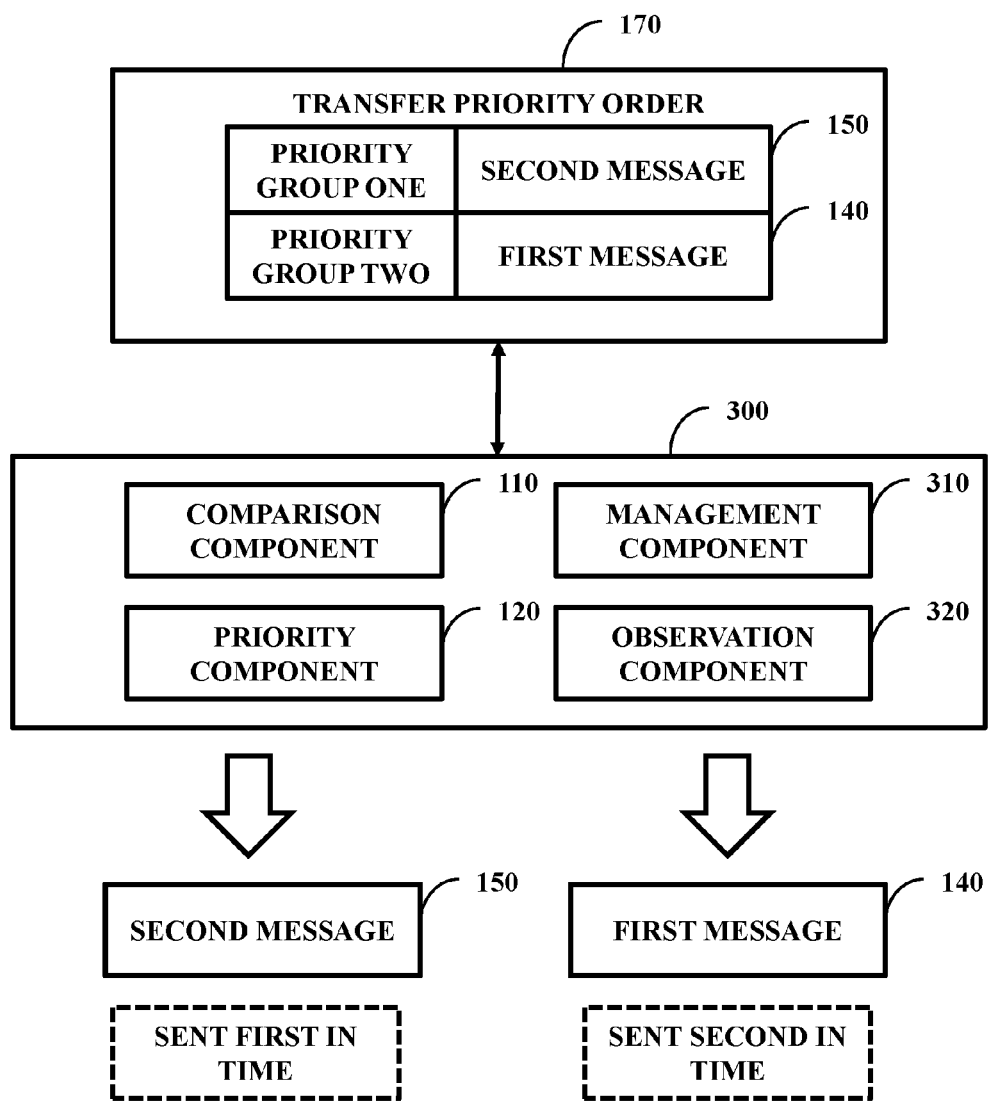
FIG. 3 illustrates one embodiment of a system comprising the comparison component, the priority component, a management component, and an observation component.

FIG. 3 illustrates one embodiment of a system 300 comprising the comparison component 110, the priority component 120, a management component 310, and an observation component 320. The comparison component 110 can function such that the first message similarity result 185 of FIG. 1B is a first number produced from a comparison of information desired by the mission 160 of FIG. 1 for improvement (e.g., optimization) with information contained by the first message 140. The comparison component 110 can also function such that second message similarity result 195 of FIG. 1B is a second number produced from a comparison of information desired by the mission 160 of FIG. 1 for improvement (e.g., optimization) with information contained by the second message 150. The priority component 120 can be configured to assign the transfer priority order 170 through assignment of the first message 140 and the second message 140 into communication groups (e.g., first message 140 into priority group one and second message 150 into priority group two) based, at least in part, on the value of the first number and the second number respectively. The management component 310 can be configured to manage emission of messages in a higher priority communication group (e.g., priority group one) before emission of a lower priority communication group (e.g., priority group two). The observation component 320 can be configured to make an observation of completion of emission of the messages in the higher communication group. The management component 310 can be configured to manage emission of messages in the lower priority communication group that is lower in priority from the higher priority communication group in response to the observation being made.

In one example, the system 300 can implement as part of a video game multiplayer hosting system. The mission 160 of FIG. 1 can be to keep players online with certain responsiveness. However, the video game multiplayer hosting system may not know how many players are playing or the status of such players. Therefore, messages can be given greater priority based on classification. A message that indicates that a player is dropped can be considered more important than a message that a player is having lagging errors. Thus, drop messages can be placed in a higher priority group while lagging messages can be placed in a lower priority group.

In one example, messages can be evaluated and assigned a number based on the amount of information they share with the mission 160 of FIG. 1. The messages can be ranked and placed in communication groups. In one example, twenty messages can be processed by the system 300 and five priority groups can be made with four messages each. In another example, nineteen messages can be processed by the system 300 and four priority groups can be made—three with five messages and one with four messages. Thus, the messages may be processed and then assigned to priority groups.

The system 300 can function as a dynamic message management system. In one example, five priority groups can be set up by the priority component 120 in the transfer priority order. As messages are processed, the messages can be given a number ranging from 1-0. The five priority groups can have ranges 1-0.8, 0.79-0.6, 0.59-0.4, 0.39-0.2, and 0.19-0. As numbers are assigned to messages the messages can be placed in different priority groups.

In another example, a message can be assigned to a priority group, but then be shifted to a different priority group at a later time. For example, two priority groups can be used—priority group one (higher priority) and priority group two (lower priority). Initially ten messages can be processed by the system 300—three with values of 0.8 (assigned to priority group one), two with values of 0.6 (assigned to priority group one), and five with values of 0.3 (assigned to priority group two). Once assigned, four not yet processed messages can be processed with values of 0.7. Thus, the four messages with values of 0.7 can be placed in priority group one while the two messages with values of 0.6 can be moved from priority group one to priority group two. Further, the system 300 can operate after some messages have been sent, such that as more messages are processed as other messages are sent the messages in the priority groups can be dynamically moved around.

The system 300 can set up the priority groups based on capabilities of a communication network used to complete the mission 160. In one example, the communication network can be configured to communicate three messages simultaneously of X size. If six messages are identified by the system 300 as being designated for transmission and the six messages are each of X size, then the priority component 120 can determine that two priority groups should be used as part of the transfer priority order 170.

Figure 4:
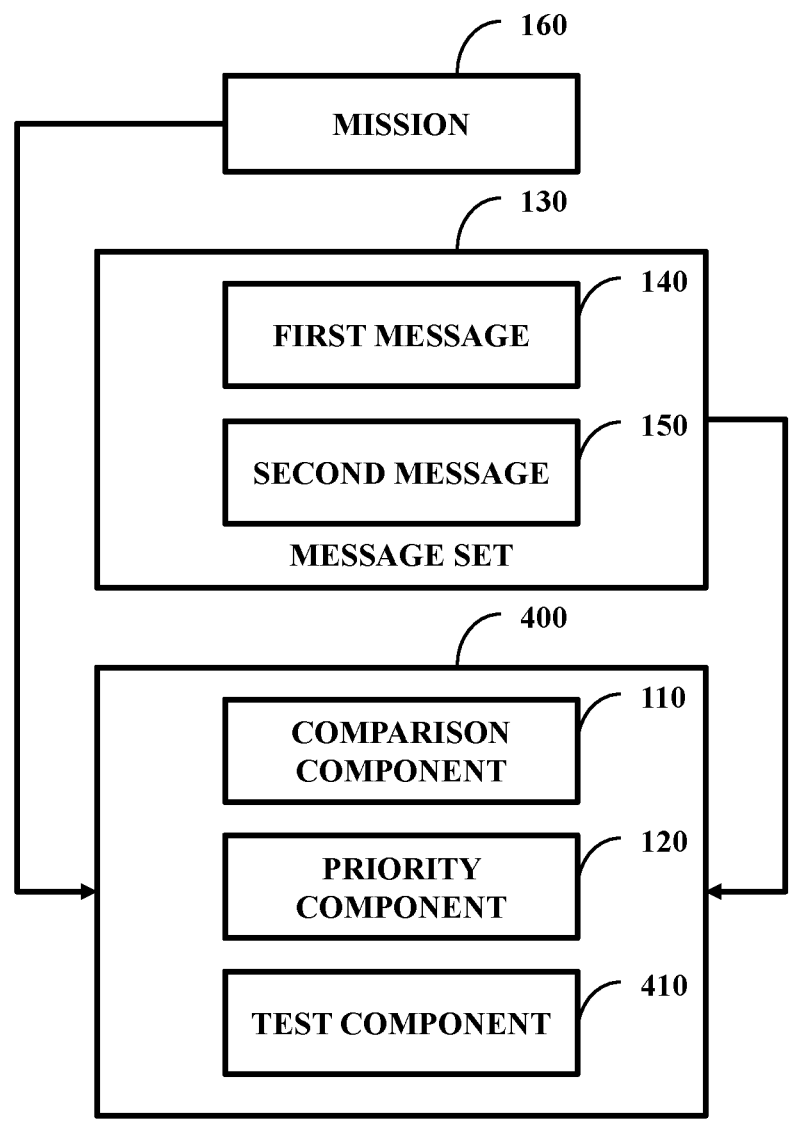
FIG. 4 illustrates one embodiment of a system comprising the comparison component, the priority component, and a test component.

FIG. 4 illustrates one embodiment of a system 400 comprising the comparison component 110, the priority component 120, and a test component 410. The test component 410 can be configured to make a determination if the message set 130 is capable of being successfully sent within a time period. The comparison component 110 and the priority component 120 can be configured to function when the determination is that the message set 130 is not capable of being successfully sent within the time period. In one embodiment, if the determination is that the message set 130 is capable of being successfully sent within the time period, then the first message 140 and the second message 150 can be sent without regard to priority or the comparison component 110 and the priority component 120 can be configured to function.

In one example, an industrial process, such as soda bottling, can have four modules—a soda mixer, a bottle filler, and a bottle sealer. The industrial process can have the mission 160 be that a set number of bottles of beer be bottled within a set amount of time. If the mission 160 is not achieved, then a diagnostic system can be used to diagnose and correct the mission failure. The diagnostic system can be designed to have a goal diagnostic time of Y seconds. The soda mixer, the bottle filler, and the bottle sealer can receive requests from the diagnostic system for performance metric information to determine why the mission 160 is failing. The soda mixer, bottle filler, and bottle sealer can have one message each to send in response to the requests and these messages can be relatively short. The test component 410 can evaluate these three messages. With this evaluation, the test component 410 can determine that these three messages can be sent to the diagnostic system with enough time remaining for the diagnostic time of Y seconds being met. In view of this, message priority arrangement with regard to information similarity may not be considered a beneficial use of resources and therefore the three messages can be sent without use of such a priority arrangement.

Figure 5:
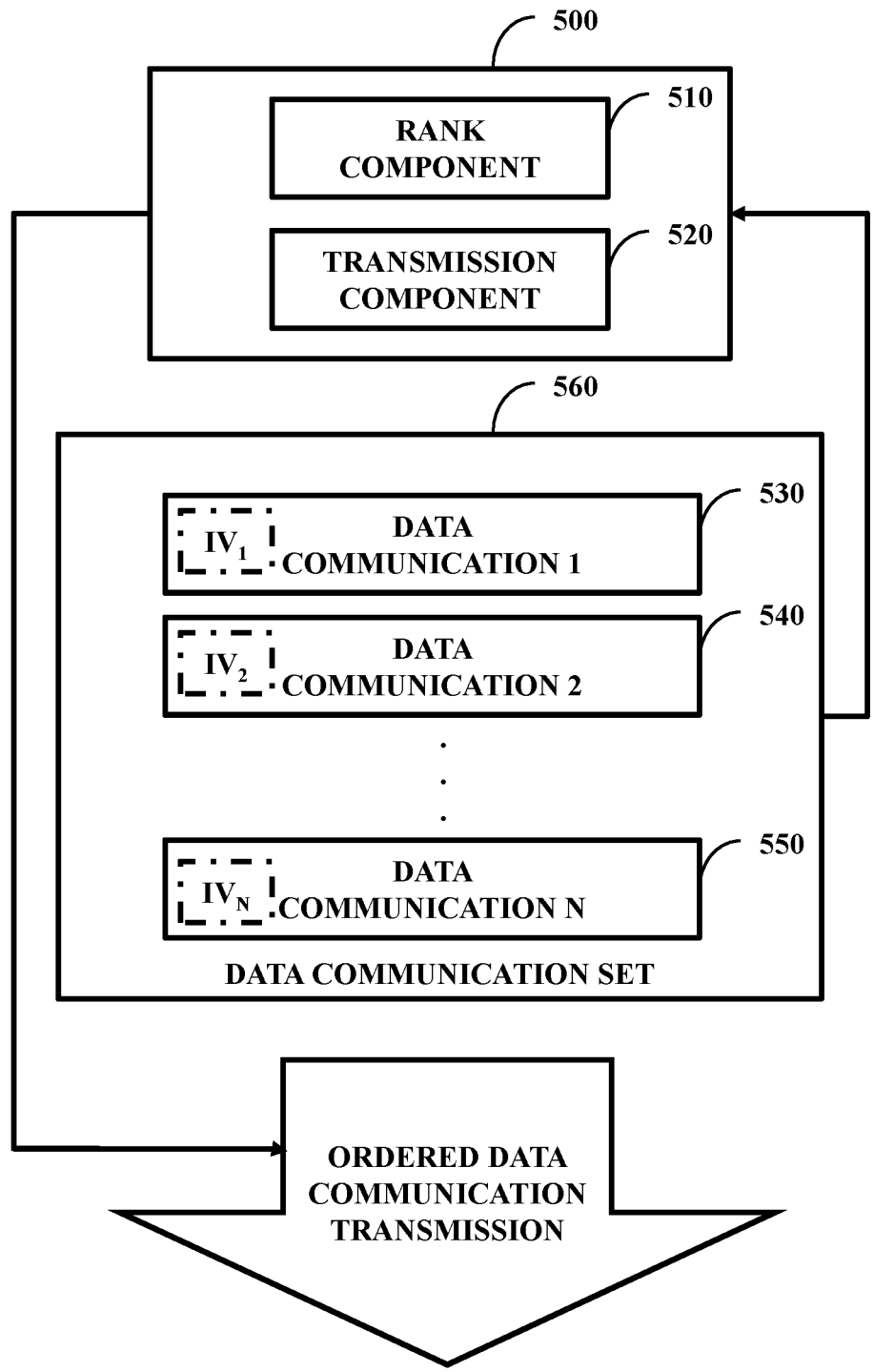
FIG. 5 illustrates one embodiment of a system comprising a rank component and a transmission component.

FIG. 5 illustrates one embodiment of a system 500 comprising a rank component 510 and a transmission component 520. The rank component 510 can rank individual data communications 530-550 of a data communication set 560 based, at least in part, on an Information Value (IV) of the individual data communications 530-550. The Information Value for a particular individual data communication (e.g., data communication 1 530) is a relationship of a content of the particular individual data communication to significant unknown data to a destination. The transmission component 520 can cause ordered transmission of the individual data communications 530-550 to the destination based, at least in part, on their rank. While the data communication set 560 is shown as having two fixed data communications 530 and 540 along with a floating data communication 550, the data communication set 560 can be configured with two individual data communications (e.g., N=2).

In one embodiment, the transmission component 520 manages communication path usage such that the higher the Information Value of the individual data communication then the shorter path (e.g., shorter in physical distance or shorter in time taken to travel) used to transmit the individual data communication (e.g., data communication 2 540) to the destination. In one example, two data communication can be part of the data communication set 560. Data communication 1 530 can be ranked above data communication 2 540. The communication path can have two sub-paths that allow for data communication 1 530 and data communication 2 540 to be sent simultaneously. However, a first sub-path may be faster to use than a second sub-path. Since data communication 1 530 is of a higher priority it can be sent down the first sub-path while data communication 2 540 can be send down the second sub-path.

In one embodiment the transmission component 520 manages communication path usage such that the higher the Information Value of the individual data communication then the more reliable path or more secure path used to transmit the individual data communication (e.g., data communication N 550) to the destination. In one example, two data communication can be part of the data communication set 560. Data communication 1 530 can be ranked above data communication 2 540. The communication path can have two sub-paths that allow for data communication 1 530 and data communication 2 540 to be sent simultaneously. However, a first sub-path may be more secure and reliable than a second sub-path. Since data communication 1 530 can be considered more important than data communication 2 540 due to the higher ranking, it can be considered more important for data communication 1 530 to arrive successfully (e.g., reach the destination, reach the destination without being re-sent, etc.). Thus, data communication 1 530 can be sent down the first sub-path.

In one embodiment, the rank component 510 ranks individual data communications of a data communication set based, at least in part, on a result from the Information Value of the individual data communications divided by a length of the individual data communications. In one example, the data communication set 560 can comprise three data communications. A first data communication and a second data communication can have equal Information Values (e.g., $IV_1=IV_2$) while a data communication 3 (e.g., represented by data communication N 550) can have an Information Value of little or no value. To break the tie on which data communication should be given priority between data communication 1 530 and data communication two 540, the Information Value can be divided by a length (e.g., size) of the respective data communication. Thus, a data communication with greater influence per unit can be given higher priority. In one embodiment, length can be used in assigning priority when two data communications do not have equal information values.

In one embodiment, the rank component 510 computes the Information Value for individual data communications of the data communication set based, at least in part, on mutual information between an individual data message and an uncertainty associated with a mission associated with the destination. The Information Value can be entropy of the mission minus conditional entropy of the mission given the individual data message.

Figure 6:
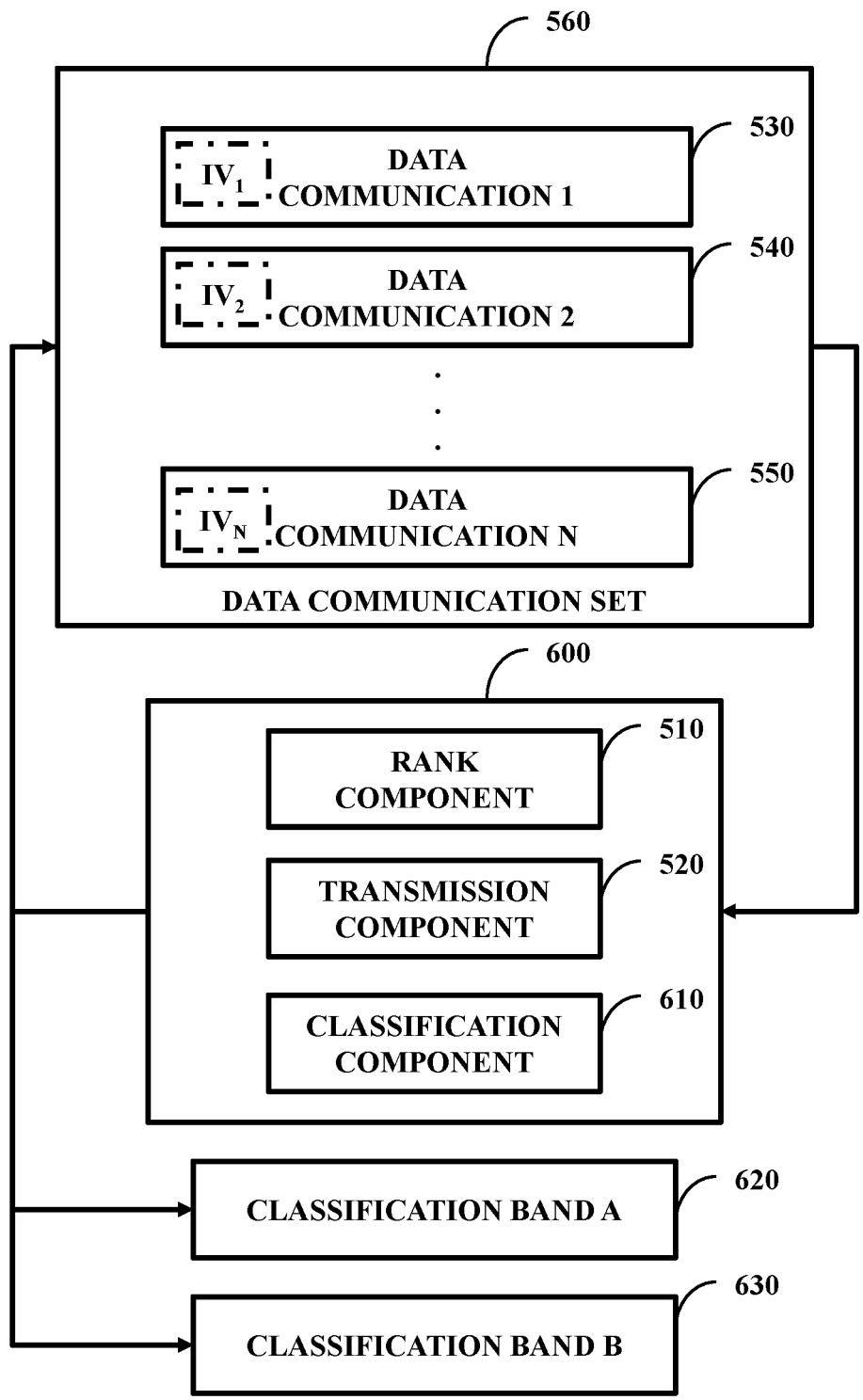
FIG. 6 illustrates one embodiment of a system comprising the rank component, the transmission component, and a classification component.

FIG. 6 illustrates one embodiment of a system 600 comprising the rank component 510, the transmission component 520, and a classification component 610. The classification component 610 can create different classification bands (e.g., classification band A 620 or classification band B 630) for the individual data communications, where the rank component 510 places the individual data communications (e.g., data communication 1 530, data communication 2 540, . . . data communication N 550) in a particular band based, at least in part, on the Information Value (e.g., $IV_1, IV_2, \ldots IV_N$) of the individual data communications. This placement can function as the rank component 510 ranking individual data communications of a data communication set based, at least in part, on an Information Value of the individual data communications (e.g., the rank component 510 does not rank two data communications against one another that are placed in the same communication band). The transmission component 520 can cause ordered transmission of the individual data communications through use of the classification bands.

In one example, the system 600 can be employed in a hospital emergency room. Data communications can be received that are pertinent to patient care. Four classification bands can be created by the classification component 610 that are, in order of highest to lowest priority, a critical communication band (e.g., a patient is non-responsive), a serious communication band (e.g., a patent is in severe pain), an important communication band (e.g., a patient has noticed a discoloration), and a useful communication band (e.g., the patent forgot to inform personal about a symptom and is providing notification about the symptom). In one example, each band can have a threshold value that the Information Value of a data communication must reach to be placed in a higher band. As communications are created they can be evaluated and placed into an appropriate band by the rank component 510. The transmission component 520 can manage transmission of these messages such that a message in the serious communication band is not sent out until there are no messages in the critical communication band and/or messages are accounted for in the critical communications band (e.g., one critical communication band message exists and two paths are available).

Figure 7:
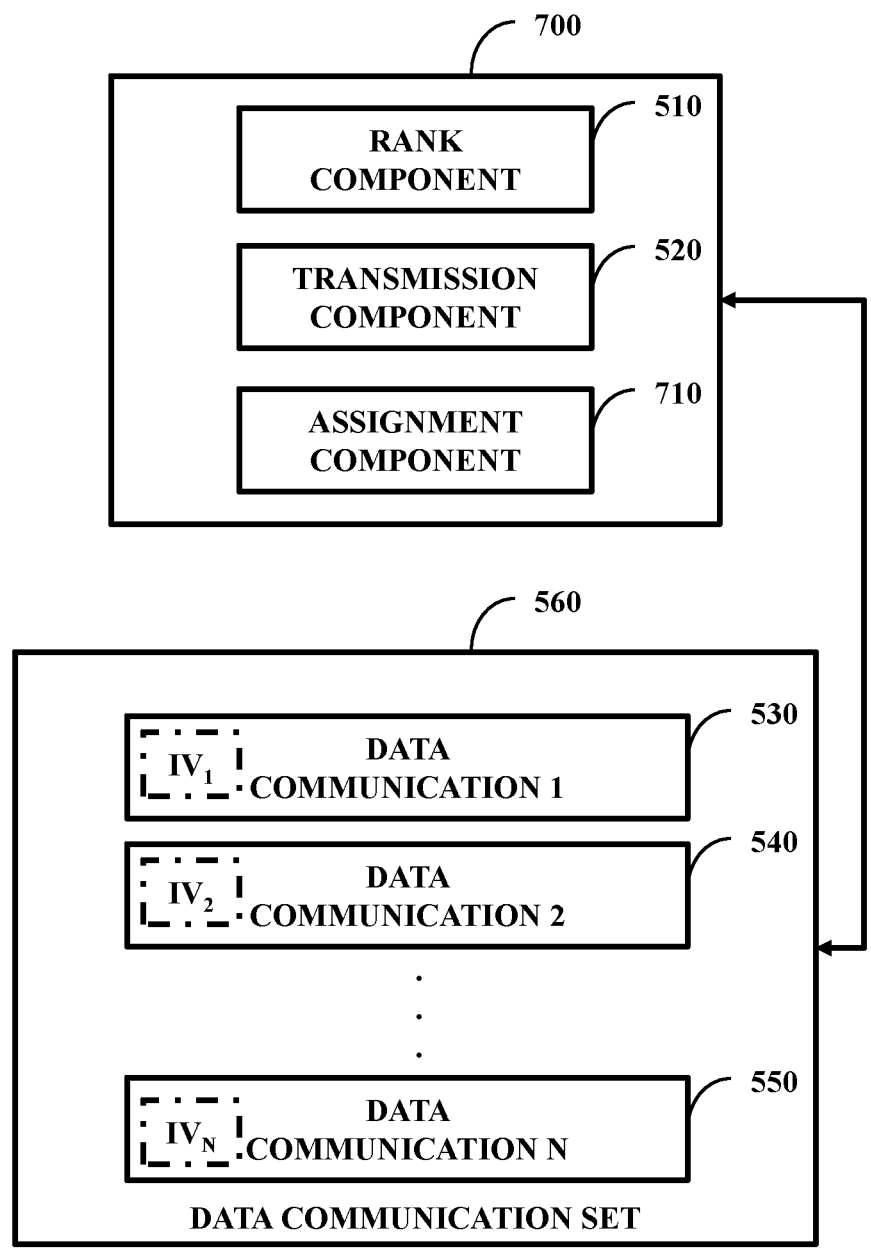
FIG. 7 illustrates one embodiment of a system comprising the rank component, the transmission component, and an assignment component.

FIG. 7 illustrates one embodiment of a system 700 comprising the rank component 510, the transmission component 520, and an assignment component 710. The assignment component 710 cab assigns the Information Value of the individual data communications (e.g., data communications 530-550) of the data communication set 560.

In one example, a police emergency system can have a police dispatch server that causes police officers to dispatch to crime scenes. Data communication 1 530 can be a gun shooting report while the data communication 2 can be a failure to use a turn signal report. Since the gun shooting can be considered more serious than the failure to use the turn signal, data communication 1 530 can be given a higher Information Value and thus be transmitted before data communication 2 540.

Assignment can be performed through producing an objective assessment of subjective data of the individual data communications. In one example, the system 700 can be employed by a government agency that provides rescue support after a disaster. As an example, an earthquake can occur in a metropolitan area and multiple buildings can collapse. In response to the earthquake major media outlets can record images of the devastation, including collapsed buildings. The government agency can request these recorded images and these recorded images can be sent to the government agency as data communications. The assignment component 710 can evaluate the images and provide an objective score to the images based on the evaluation. In one example, a particular image can be of a dog is barking near a pile of rubble. The assignment component 710 can infer that the dog barking near a pile of rubble is indicative that a survivor is trapped under the rubble. Thus, the assignment component 710 can assign a relatively high Information Value to the particular image and thus the particular image (e.g., still frame or video) can be sent to rescue personnel early since rescue personnel receiving that message in a timely manner could save a life. The above discussed inference can be performed by the assignment component through use of at least one artificial intelligence technique.

In one embodiment, an Information Value of a first individual data communication (e.g., $IV_1$ of data communication 1 530) of the data communication set 560 is dependent on an Information Value of a second individual data communication (e.g., $IV_2$ of data communication 2 540) of the data communication set 560. The Information Value of the second individual data communication of the data communication set 560 can be dependent on the Information Value of the first individual data communication of the data communication set 560. Thus, Information Values of data communications of the data communication set 560 can be dependent upon one another.

In one example, the data communication set 560 can have two data communications—data communication 1 530 and data communication 2 540. Initially, $IV_1$ and $IV_2$ can each be set to 50/100 by the assignment component 710. The assignment component 710 can evaluate the content of the two data communications and determine that data communication 1 530 has more important information than data communication 2 540. Therefore, $IV_1$ can be set to 70/100 and $IV_2$ can be set to 30/100. In one embodiment, the Information Values can change as more information about data communications is learned, as more data communications are received and/or processed, etc.

Figure 8:
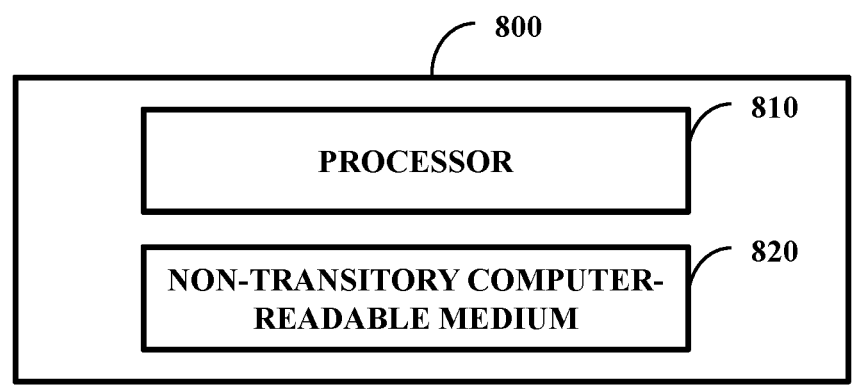
FIG. 8 illustrates one embodiment of a system comprising a processor and a non-transitory computer-readable medium.

FIG. 8 illustrates one embodiment of a system 800 comprising a processor 810 and a non-transitory computer-readable medium 820. In one embodiment the non-transitory computer-readable medium 820 is communicatively coupled to the processor 810 and stores a command set executable by the processor 810 to facilitate operation of at least one components disclosed herein (e.g., the rank component 510 of FIG. 5 and/or the transmission component 520 of FIG. 5). In one embodiment, at least one component disclosed herein (e.g., the comparison component 110 of FIG. 1 and/or the priority component 120 of FIG. 1) can be implemented, at least in part, by way of non-software, such as implemented as hardware by way of the system 800. In one embodiment the non-transitory computer-readable medium 820 is configured to store processor-executable instructions that when executed by the processor 810 cause the processor 810 to perform a method disclosed herein (e.g., the method 900 and the method 1000 discussed below).

Figure 9:
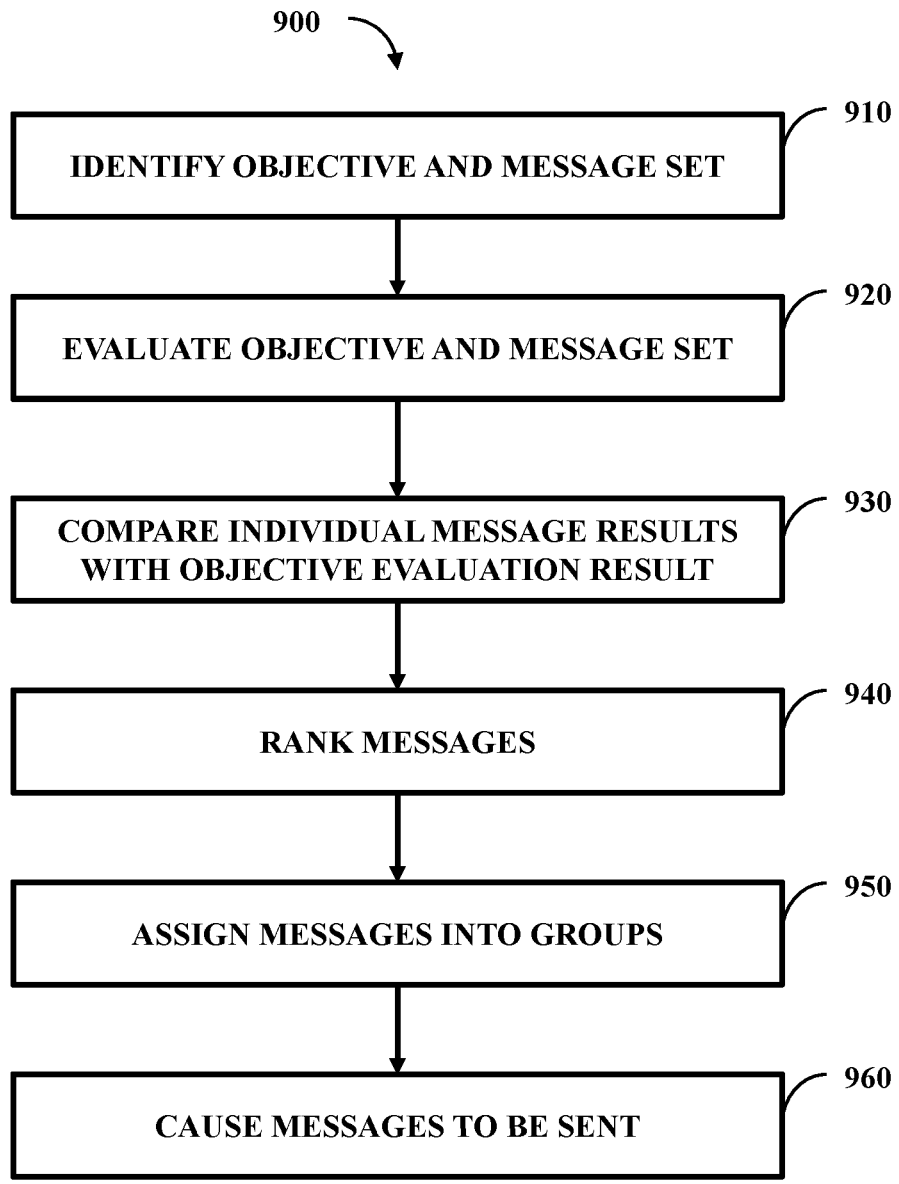
FIG. 9 illustrates one embodiment of a method comprising six actions.

FIG. 9 illustrates one embodiment of a method 900 comprising six actions 910-960. At 910 there can be identifying an objective of an entity of interest and identify a message set designated for communication along a communication path, where the communication path is not capable of being used for communication of the message set within a time frame. At 920 there can be evaluating the objective to produce an objective evaluation result and evaluating individual messages of the message set to produce individual message results that are suitable for comparison with the objective evaluation result. In one embodiment, a probability distribution function that considers a random variable can be employed with regard to evaluating the objective and evaluating individual messages.

Comparing individual message results with the objective evaluation result to produce individual comparison results for individual messages of the message set that designate a similarity quantity of an individual message with the objective can take place at 930. In one embodiment, the similarity quantity of the individual message with the objective can be how successfully the individual message communicates beneficial information that is not known to the entity of interest.

At 940 there can be ranking the plurality of messages according to their individual comparison result in order of their similarity quantity with more similarity equating to higher ranking. Assigning individual messages of the plurality of messages into one of a plurality of priority groups (two or more priority groups) can occur at 950, where individual priority groups of the plurality of priority groups are ordered from first for communication to last for communication. Multiple priority groups can have multiple messages. In one embodiment, a first group of the plurality of priority groups comprises a first message and a second message while the second group of the plurality of priority groups comprises a third message and a fourth message.

Causing the individual messages to be sent to the entity of interest in accordance with the order of their priority group can occur at 960. In one embodiment, causing the individual messages to be sent to the entity of interest in accordance with the order of their priority group comprises sending messages of a higher priority group earlier in time than messages of a lower priority group. In one embodiment, causing the individual messages to be sent to the entity of interest in accordance with the order of their priority group comprises sending messages of a higher priority group on a quicker portion of the communication path (e.g., shorter portion than another portion) than a portion of the communication path used in sending messages of a lower priority group. In one embodiment, the communication path is part of a Mobile ad hoc Network (e.g., a Mobile ad hoc Network that is created to complete the objective and that is discontinued after the objective is completed and/or the objective can no longer be completed).

In one example, a social network website can allow users to post messages and for other users, such as those on a friend list, to provide response messages. In this example, a user can post a question "I have two football tickets to the game tomorrow and am looking for someone to go with me, I am looking for face value of $50 for my extra, but will take best offer (or even free just to go with someone." From this question a determination can be made (e.g., by the system 100 of FIG. 1 or by the system 800 of FIG. 8) that the objective is for the user to find someone to go to the game with him or her. Four classification bands can be created—one for those offering face value or greater, those offering money less than face value, those willing to go and not willing to pay money, and other comments such as regrets or comments on the game. As friend responses are received they can be processed and sent in a priority in accordance with their respective band. Thus, the user can find people willing to pay face value for the ticket before finding people willing to go without paying. In one example, a social network manager can manage traffic among different users such that more important messages are transmitted before less important messages based on an objective of the social network manager, an objective of an advertiser that pays a fee to the social network manager and/or at least some users, an expressly stated objective of users, an inferred objective of users, etc.

Figure 10:
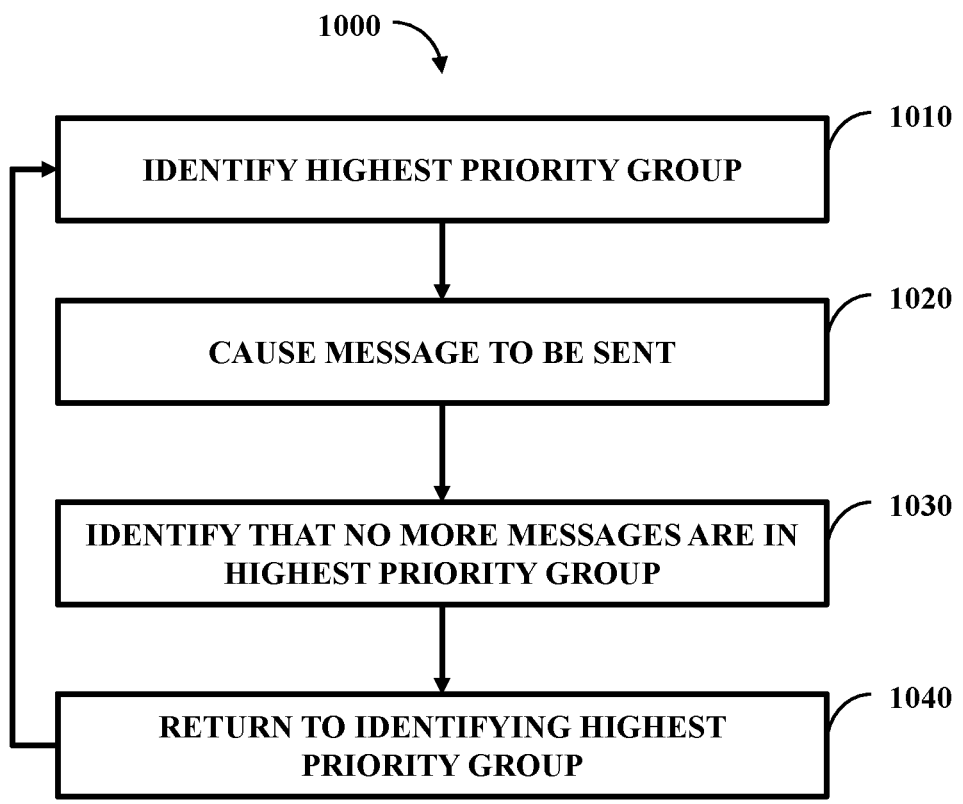
FIG. 10 illustrates one embodiment of a method comprising four actions.

FIG. 10 illustrates one embodiment of a method 1000 comprising four actions 1010-1040. At 1010 there can be identifying a priority group with a highest priority level assigned with an individual message. At 1020 causing a message of the priority group with a highest priority level to be sent can occur. Identifying that the priority group with a highest priority level has no message assigned can take place at 1030. At 1040 returning to identifying the priority group with the highest priority level assigned with the individual message and continuing until no more individual messages remain or until the time frame expires can occur. In one embodiment, the actions 1010-1040 of the method 1000 can function as causing the individual messages to be sent to the entity of interest in accordance with the order of their priority group.

Figure 11:
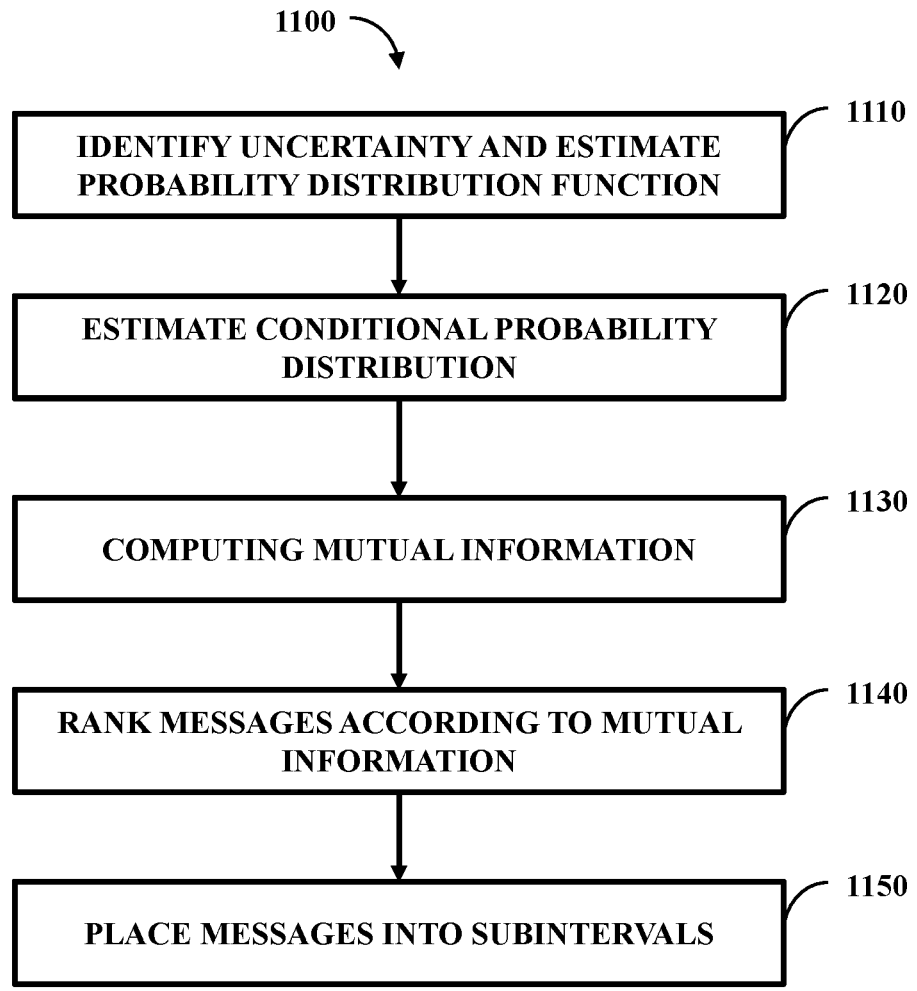
FIG. 11 illustrates one embodiment of a method comprising five actions.

FIG. 11 illustrates one embodiment of a method 1100 comprising five actions 1110-1150. The method 1100 can be used to determine an assigned priority of a message based on the mutual information of the message with an entity of interest. The entity of interest can be related to uncertainties associated with a mission that a network supports. The method 1100 can function such that the larger the mutual information between a message and the entity of interest is, the higher the priority of that message should be. Mutual information between two variables (e.g., random variables), as used in Information Theory, can be the reduction in the uncertainty of one due to the knowledge of the other.

Networks can be used to convey information to users that may be beneficial to the users in fulfilling their missions. A mission can be represented as a decision process where the user of the network makes decision to take certain actions, such as allocating resources towards the fulfillment of a goal, without necessarily having access to certain facts which may influence the decision process. The lack of facts to users can be viewed as an uncertainty and this uncertainty can be represented as random variables. The role of the messages transmitted by the network is to reduce the uncertainty associated with the decision problem. The more the uncertainty is reduced, the better the outcome of the decision process can be.

The metric the uncertainty associated with a random variable can be the random variable's entropy, measured in bits. This can be calculated as the negative of the expected value of the logarithm of the random variable's distribution function. The mutual information between a random variable and a message can be the entropy of the random variable minus the conditional entropy of that random variable given the message. Conditional entropy can also be calculated as the negative of the expected value of the logarithm of the random variable's conditional distribution function given the message. In view of this, the method 900 can be used to determine the relative priorities of the messages.

At 1110 there can be identifying the uncertainty in the mission that the network supports and estimate a probability distribution function of the mission. This estimation can be performed, in one embodiment, by first identifying a set of possible values for the random variable and estimating a likelihood of an occurrence of elements in a set based on prior information regarding the random variable. The output of this estimation can be likelihood values.

At 1120 estimating a conditional probability distribution of the random variable of individual messages can occur. This estimation can occur for various individual messages for communication. This estimating can be done by adjusting the likelihood values in light of the knowledge gained by the message and by the use of Bayes' rule in probability theory. At 1130 there can be computing mutual information between the message and the random variable for individual messages using the probability distribution function and the conditional probability functions.

At 1140 the individual messages can be ranked according to their mutual information values. Along with being ranked, the messages can be divided into N subintervals based on the mutual information value of the respective message. Individual subintervals can be defined by a range of mutual information values that cause an individual message to be placed into that subinterval.

At 1150 individual messages can be placed into one of the subintervals according to their Mutual Information values. The number associated with the subinterval where the message falls is the priority of that message. In one example, a message with the highest mutual information value can have priority 1, which can be considered a highest priority.

Figure 12:
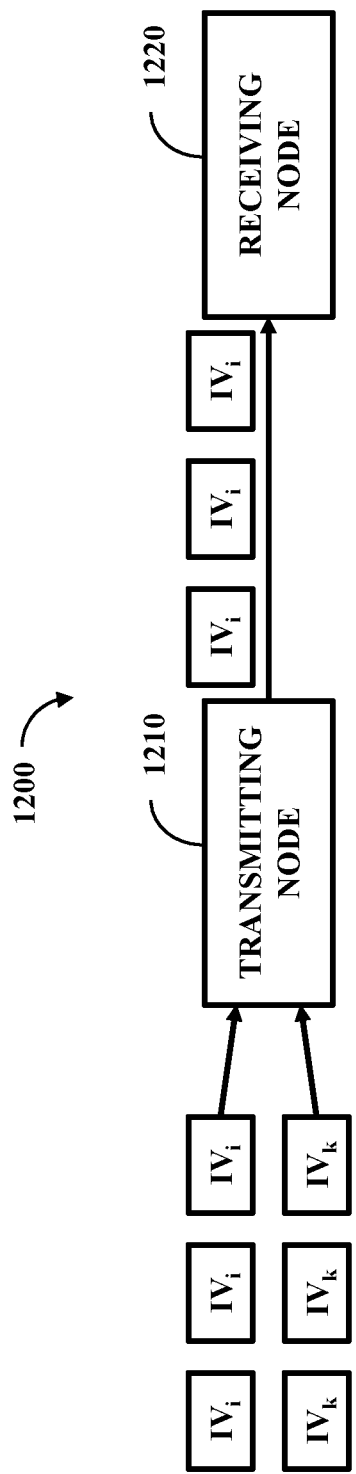
FIG. 12 illustrates one embodiment of a network portion comprising a transmitting node and a receiving node.

FIG. 12 illustrates one embodiment of a network portion 1200 comprising a transmitting node 1210 and a receiving node 1220. The network portion 1200 (e.g., that is part of a larger network or that is a network itself) can be used in practicing at least one aspect disclosed herein, including defining and identifying valuable messages, to which network resources should be allocated.

As data traffic grows different solutions can be implemented so important information reaches an intended destination in a timely manner and a network (e.g., a network that includes the network portion 1200). An upper bound to a maximum data rate out of a bandwidth constrained channel of the network can be determined by the Shannon rate, which is proportional to the available bandwidth (e.g., the assigned frequency spectrum at a wireless link). Since the frequency spectrum may be a non-renewable and finite commodity, an action in trying to keep up with the exponentially growing data traffic can be to increase the spectral efficiency, that is, to maximize bits/seconds/Hertz.

One can start by tying to maximize the available data rate on the wireless links in the network. This can be accomplished by choosing a combination of modulation and coding such that one gets as close as possible to the Shannon rate for a given signal to noise ratio. The point to point link rate can be further enhanced by the use of MIMO (multiple-input and multiple-output) antennas.

More spectral efficiency enhancements can be accomplished by refining link access methods. When a wireless link is shared by multiple nodes, orthogonal signals can be used to share the link. This allows users to transmit simultaneously without interfering with each other. Examples of orthogonal signals include the ones controlled by a Time Division Multiple Access (TDMA) scheduler. Since signals do not overlap in time, the inner product of the signals from users i and j can be be zero, thus they are orthogonal, such as:

$$\int_0^T s_i(t) s_j(t) dt = 0$$

Other example orthogonal signals can be found in users of a Code Division Multiple Access (CDMA) enabled system, where signals are processed using orthogonal codes. While being orthogonal is discussed, aspects disclosed herein can be practiced with signals that are not exactly orthogonal. Multi-User Detection (MUD) can be employed to enable non-orthogonal signals to be squeezed in a channel, thus increase the number of users that can transmit simultaneously, thereby enhancing the spectral efficiency of a shared wireless link.

Further spectral efficiency improvements in the network can be obtained by frequency re-use. One way to accomplish this is to use narrow-beam directional antennas, which allows simultaneous use of the same frequency spectrum over non-interfering beams. The frequency re-use can be further enhanced by using a combination of directional antennas, TDMA and power control.

With regard to the Network Layer, more spectrum efficiency enhancements can be accomplished by refining the routing protocols. When nodes are on the move, proactive routing protocols such as OSPF (Open Shortest Path First) and its variants can generate excessive amounts of control traffic. Refinements of the routing protocols to reduce protocol overhead can lead to increasing spectral efficiency. Also, routing protocols which distribute traffic uniformly over the network can improve spectral efficiency, example of which includes QoS (Quality of Service) routing.

Even with the enhancements discussed in the past few paragraphs, growth in network capacity may not match or exceed the growth in traffic. Thus, users of a MANET (Mobile ad hoc Network) may not ultimately have access to sufficient network resources to fulfill their information superiority requirements. When network congestion occurs, there can be benefit to quickly identifying valuable information, which would be transmitted first. A method to identify valuable information can be employed to satisfy a mission that the MANET supports. As the word ad hoc implies, a MANET is usually setup to support a specific mission, though this may not always be the case. The value of information can be considered tightly coupled to the mission and/or to where the information is used. If the information plays an important role in the execution of a mission, then value of the information can be considered high. In one embodiment, executing a mission can be defined as making best use of available resources and information towards fulfilling a goal. Thus, executing a Mission can be formally represented as a constrained optimization problem, such as:

$$\operatorname*{Max}_{a(\cdot) \in A} E \int_0^T \{U(a(\eta(\omega)), \omega, |\eta(\omega)\} dt \qquad (1)$$

Where

U(.): Utility of the Mission a(t): Action vector

A: Constraint set of actions

ω: Random vector

η(.): Information vector

The outcome of the above maximization problem can be considered highly dependent on the information vector η. Thus, the value of information η, denoted by V(η), can be quantified by how well the mission can be executed with the information, compared with what can be done without the information. The impact of the information can be represented using conditional expectations. Thus, the value of information can be formally stated as:

$$V(\eta) = \underset{a \in A}{\text{Max}} \int_0^T E\{U(a(t), \omega \mid \eta(\omega))\} dt - \underset{a \in A}{\text{Max}} \int_o^T E\{U(a(t), \omega)\} dt \quad (2)$$

In general, computation of the above entity may be difficult. Instead, the value of information can be recast as one which involves mutual information of random variables. To this end, with an assumption that that U(.) is strictly concave in a, for realizations of the random vector ω. The random variable y(.) can be defined as:

$$y(\omega) = \underset{a \in A}{\max} \int_0^T U(a(\eta(\omega)), \omega) dt \quad (3)$$

For a given realized value of the random variable ω, maximizing y(ω) over a(.) will yield a higher realized value of the objective function compared with the optimization problem defined in (1), where the actual value of ω is not known. This is because in (1), the utility function is averaged out over all possible values of ω, using the probability distribution function of ω. Instead, the optimization operation defined in (3) is to be conducted based on the actual realized of the random variable ω. Due to concavity of U(.), knowing the exact value of ω will yield a higher or equal value of the utility function over the case where maximization is carried over the expected value of the utility function. With a further assumption that ω takes its values over a discrete set with a finite support, then the message with the most valuable information for the mission is the one which would provide the most help in decoding the actual realized value of y(ω). In one example, suppose that the mission is to destroy a target at an unknown location. The outcome of the utility function is 1, if the target is destroyed within a given period of time. The outcome of the utility function is 0 otherwise. An assumption can be made that the forces are capable of performing the duty, provided that they can find the target. A message which completely identifies the location of the target would be among the set of possible messages with the highest information value relative to the mission that the MANET supports. This observation suggests the following approach to rank the value of information associated with a message. Let p(y) denote the probability distribution function of the random variable y, p(η) the probability distribution function of η and p(y, η) the joint probability distribution function of y and η. The mutual information between y and η, denoted by I(y, η), can be defined as:

$$I(y, \eta) = \sum_y \sum_\eta p(y, \eta) \log \frac{p(y, \eta)}{p(y)p(\eta)} = H(y) - H(y \mid \eta) \quad (4)$$

In the above, H(y) denotes the entropy of y and H(y|η) represents the conditional entropy of y given η. Then, a message with the highest information value can be defined as the one which assumes the highest value of the mutual information with the random variable representing the optimized Utility function, prior to the expectation operation. In other words, messages with highest information values can be the ones which reduce the uncertainty associated with the optimization problem by the highest margin. This suggests an algorithm where messages are ranked according to the values of their respective mutual information with the mission's optimized Utility function. Note that, without taking the expected value, the optimized mission Utility function is a random variable. Messages can be prioritized according to the ranking of their mutual information with the optimized mission Utility function. This priority ranking can be used during the transmission of the messages.

With a theorem, let the random variable ω with finite support represent the uncertainties associated with a decision system, where the network has a finite capacity and is used to transport messages which contain information related to ω. The goal can be to maximize a Utility function which is a concave function of the decisions of the user, for values of ω. Then, the message with the highest value of the mutual information with y(ω), as defined in Equation (3), yields the highest value in the maximization of the Utility function. Furthermore, messages can be ranked according to their value of information as defined in Equation (2) based on their respective mutual information with the random variable y(ω).

The above theorem can be supported with the following proof. A message η's mutual information with y(ω) can be the reduction (in bits) of the uncertainty of y(ω) With the uncertainty in y(ω) being N bits and the mutual information of Message $\eta_1$ and y(ω) being N, that is, $\eta_1$ completely defines y(ω). Further the mutual information of the message $\eta_2$ and y(ω) can be N−1 bits. Then, due to concavity of U(.), knowledge of $\eta_1$ would provide a higher or equal value of U(.) compared with the knowledge of $\eta_2$, in that the former is a deterministic optimization problem and the latter involves an average over random variable with a support of two bits. A message $\eta_k$ whose mutual information with y(ω) can be K<N. Taking conditional expectations, the knowledge of $\eta_k$ would yield a higher or equal value of U(.) compared with the knowledge of $\eta_{k-1}$ whose mutual information with y(ω) is K−1 bits. Thus, by induction, the claim holds true.

The Value of Information V(η) can be defined as an instantiation of the Operational Information Content Capacity (OICC) concept. OICC can be defined in broad terms as is an indicator of the decision making capability that the collection of sources and links that the network can provide. A specific metric can be used which pertains to the messages transmitted over the network in order to support the underlying mission.

Quality of Information (QoI) can refer to the attributes of the information carried in a message, such as provenance, accuracy & precision, reliability, credibility & corroboration and timeliness. Value of Information (VoI) can be defined as different from QoI. VoI's primary use can be to identify the relative importance of messages transmitted in the network. Specification of the QoI vector associated with a message can be used in identifying network resources such that the message can be delivered without compromising its QoI. Thus, the QoI of a message can be closely tied to the Quality of Service (QoS) that a network needs to provide, so that the QoI of the delivered message is acceptable.

In one embodiment, total Value of Information in a MANET can be maximized. An assumption can be made that information transmitted over a MANET is represented by a sequence of messages, where each Message $\eta_k$ is associated with an Information Value $V(\eta_k)$ and a QoI vector, which can be translated into a set of QoS requirements. An assumption can be made that the utilization of the network is relatively high so that some packets may incur high delays and/or be dropped. There may be a finite number of message types, p=1, 2, ..., P. For simplicity and without loss of generality, an assumption can be made that each message of type p has the same message length value Message_Length$_p$, the same Information value $V_p(\eta)$ and the same set of QoS requirement $Q_p(\eta)$.

For p, assume that $Q_p(\eta)$ can be expressed as a combination of network performance measures such as minimum throughput, maximum delay and minimum jitter. Assume messages are ranked per their $V_p(\eta)$ using the mutual information. Thus, in effect, the index p denotes the priority associated with the message and thereby the priority of packets associated with that message. A further assumption can be made that the network is running a priority-aware QoS routing algorithm, which is responsive enough to keep track of node movements.

Messages can be generated from a source node (e.g., that is also the transmitting node 1210) as a random process. The messages can be are subdivided into packets and they are routed to a destination node (e.g., the receiving node 1220). The goal can be to maximize the total Value of Information successfully transported in a possibly congested MANET over a given period of time, which can be shown by:

$$\text{Max} \int_0^T \sum_{p=1}^P \sum_{k=1}^\infty V_p(\eta_k(t))dt \quad (5)$$

over the set of all packet processing policies
such that the QoS requirements are satisfied Value of Information Density (IVD$_p$) of message type p can be defined as:

$$IVD_p = \frac{V_p(\eta)}{MessageLength_p} \quad (6)$$

With a simple two-node network with two types of messages that can be the network portion 1200, suppose IVD$_i$>IVD$_k$ and let the transmitting node 1210 be attempting to maximize the total Value of Information that it transmits. The transmitting node 1210 can be configured to limit transmission to packets associated with message type i, until they are exhausted. Consider now a highly utilized MANET with many nodes, with multiple nodes generating messages of multiple types, with their associated QoS requirements and IVD values as defined in Equation (6). Based on the above discussion, a policy can be used where: packets are prioritized per their respective IVD, packets are routed using a Priority aware QoS Routing Protocol, and packets are processed at a source (e.g., the transmitting node 1210) and an intermediary node (e.g., the transmitting node 1210 when a different node is the source node) using a strict Priority Policy. The above policy tends to maximize the total Value of Information successfully transported over a given period of time, as defined in Equation (5).

A Priority Aware QoS Routing Algorithm can be used in practicing at least one aspect disclosed herein. This algorithm can function as a Link State Routing Algorithm with QoS constraints. With this algorithm, QoS Metrics which are exchanged among the Nodes can be subdivided into priorities (e.g., buffer occupancy values exchanged using the routing protocol are provided for different priority levels). The algorithm can function such that when shortest Routes satisfying QoS requirements of a given priority level are computed, requirements associated with lower priority traffic are ignored. If routes which satisfy the QoS constraints of lower priority messages cannot be identified, the messages can be routed on a best effort basis over shortest paths. Packets can be treated with strict priority at the transmitting node 1210 (e.g., as a source or as an intermediary node). The priority can be pre-emptive if the following condition is satisfied: the remaining time to transmit a lower priority packet is less than a threshold, which is determined by the IVD value of the higher priority packet, length of the higher priority packet, and the IVD value of the lower priority packet.

Using this routing algorithm, messages with highest Information Values are routed over the shortest paths in the network which satisfy their QoS requirements, ignoring lower priority traffic. Then, lower priority traffic is to be routed over the remaining shortest paths after higher priority traffic is accounted for. This allows for the network to gradually incorporate its resources (e.g., links, buffers, etc.) for use, such that the more valuable the information is, the quicker it is transported (using paths which are shorter at higher priorities). Thus, a priority aware QoS Routing algorithm such as the one described above tends to maximize the total value of information transported over a given period of time in a possibly congested network.

It is to be appreciated by one of ordinary skill in the art that content discussed with regard to FIG. 12, such as equations included below, are embodiments and are not requirements of performing aspects disclosed herein. Further, it is to be appreciated by one of ordinary skill in the art that definitions provided above with regard to FIG. 12 are non-exclusive definitions unless the claims expressly state as such.

What is claimed is:

1. A non-transitory computer-readable medium that stores processor-executable instructions that when executed by a processor cause the processor to perform a method, the method comprising:
    identifying an objective of an entity of interest;
    identifying a message set designated for communication along a communication path, where the communication path is not capable of being used for communication of the message set within a time frame;
    evaluating the objective to produce an objective evaluation result;
    evaluating individual messages of the message set to produce individual message results that are suitable for comparison with the objective evaluation result;
    comparing individual message results with the objective evaluation result to produce individual comparison results for individual messages of the message set that designate a similarity quantity of an individual message with the objective;

ranking the plurality of messages according to their individual comparison result in order of their similarity quantity with more similarity equating to higher ranking;

assigning individual messages of the plurality of messages into one of a plurality of priority groups, where individual priority groups of the plurality of priority groups are ordered from first for communication to last for communication; and causing the individual messages to be sent to the entity of interest in accordance with the order of their priority group.

2. The non-transitory computer-readable medium of claim 1, where the similarity quantity of the individual message with the objective is how successfully the individual message communicates beneficial information that is not known to the entity of interest.

3. The non-transitory computer-readable medium of claim 2, where causing the individual messages to be sent to the entity of interest in accordance with the order of their priority group comprises sending messages of a higher priority group earlier in time than messages of a lower priority group.

4. The non-transitory computer-readable medium of claim 3, where causing the individual messages to be sent to the entity of interest in accordance with the order of their priority group comprises sending messages of a higher priority group on a quicker portion of the communication path than a portion of the communication path used in sending messages of a lower priority group.

5. The non-transitory computer-readable medium of claim 4, causing the individual messages to be sent to the entity of interest in accordance with the order of their priority group comprises:

identifying a priority group with a highest priority level assigned with an individual message;

causing a message of the priority group with a highest priority level to be sent;

identifying that the priority group with a highest priority level has no message assigned;

returning to identifying the priority group with the highest priority level assigned with the individual message and continuing until no more individual messages remain or until the time frame expires.

6. The non-transitory computer-readable medium of claim 5, where:

the method employs a probability distribution function that considers a random variable with regard to evaluating the objective and evaluating individual messages, the communication path is part of a Mobile ad hoc Network, a first group of the plurality of priority groups comprises a first message and a second message, and a second group of the plurality of priority groups comprises a third message and a fourth message.

7. A system, comprising:

an identification component configured to identify an objective of an entity of interest and configured to identify a message set designated for communication along a communication path, where the communication path is not capable of being used for communication of the message set within a time frame;

an evaluation component configured to evaluate the objective to produce an objective evaluation result and configured to evaluate individual messages of the message set to produce individual message results that are suitable for comparison with the objective evaluation result;

a comparison component configured to compare individual message results with the objective evaluation result to produce individual comparison results for individual messages of the message set that designate a similarity quantity of an individual message with the objective;

a rank component configured to rank the plurality of messages according to their individual comparison result in order of their similarity quantity with more similarity equating to higher ranking;

an assignment component configured to assign individual messages of the plurality of messages into one of a plurality of priority groups, where individual priority groups of the plurality of priority groups are ordered from first for communication to last for communication; and a causation component configured to cause the individual messages to be sent to the entity of interest in accordance with the order of their priority group, where the identification component, the evaluation component, the comparison component, the rank component, the assignment component, the causation component, or a combination thereof is implemented, at least in part, by way of non-software.

8. The system of claim 7, where the similarity quantity of the individual message with the objective is how successfully the individual message communicates beneficial information that is not known to the entity of interest.

9. The system of claim 7, where causing the individual messages to be sent to the entity of interest in accordance with the order of their priority group comprises sending messages of a higher priority group earlier in time than messages of a lower priority group.

10. The system of claim 7, where causing the individual messages to be sent to the entity of interest in accordance with the order of their priority group comprises sending messages of a higher priority group on a quicker portion of the communication path than a portion of the communication path used in sending messages of a lower priority group.

11. The system of claim 7, where the identification component is configured to identify a priority group with a highest priority level assigned with an individual message, where the causation component is configured to cause a message of the priority group with a highest priority level to be sent, where the identification component is configured to identify that the priority group with a highest priority level has no message assigned;

where the identification component is configured to return to identify the priority group with the highest priority level assigned with the individual message and continue operation until no more individual messages remain or until the time frame expires.

12. The system of claim 7, where the evaluation component employs a probability distribution function that considers a random variable, where a first group of the plurality of priority groups comprises a first message and a second message, and where a second group of the plurality of priority groups comprises a third message and a fourth message.

13. The system of claim 7,
where the communication path is part of a Mobile ad hoc Network.

14. A system, comprising:
a processor; and
non-transitory computer-readable storage medium communicatively coupled to the processor that stores a command set executable by the processor to facilitate operation of components comprising:
an identification component configured to identify an objective of an entity of interest and configured to identify a message set designated for communication along a communication path, where the communication path is not capable of being used for communication of the message set within a time frame;
an evaluation component configured to evaluate the objective to produce an objective evaluation result and configured to evaluate individual messages of the message set to produce individual message results that are suitable for comparison with the objective evaluation result;
a comparison component configured to compare individual message results with the objective evaluation result to produce individual comparison results for individual messages of the message set that designate a similarity quantity of an individual message with the objective;
a rank component configured to rank the plurality of messages according to their individual comparison result in order of their similarity quantity with more similarity equating to higher ranking;
an assignment component configured to assign individual messages of the plurality of messages into one of a plurality of priority groups, where individual priority groups of the plurality of priority groups are ordered from first for communication to last for communication; and
a causation component configured to cause the individual messages to be sent to the entity of interest in accordance with the order of their priority group.

15. The system of claim 14,
where the similarity quantity of the individual message with the objective is how successfully the individual message communicates beneficial information that is not known to the entity of interest.

16. The system of claim 14,
where causing the individual messages to be sent to the entity of interest in accordance with the order of their priority group comprises sending messages of a higher priority group earlier in time than messages of a lower priority group.

17. The system of claim 14,
where causing the individual messages to be sent to the entity of interest in accordance with the order of their priority group comprises sending messages of a higher priority group on a quicker portion of the communication path than a portion of the communication path used in sending messages of a lower priority group.

18. The system of claim 14,
where the identification component is configured to identify a priority group with a highest priority level assigned with an individual message,
where the causation component is configured to cause a message of the priority group with a highest priority level to be sent,
where the identification component is configured to identify that the priority group with a highest priority level has no message assigned;
where the identification component is configured to return to identify the priority group with the highest priority level assigned with the individual message and continue operation until no more individual messages remain or until the time frame expires.

19. The system of claim 14,
where a first group of the plurality of priority groups comprises a first message and a second message and
where a second group of the plurality of priority groups comprises a third message and a fourth message.

20. The system of claim 14,
where the evaluation component employs a probability distribution function that considers a random variable and
where the communication path is part of a Mobile ad hoc Network.

* * * * *